US012359668B2

(12) United States Patent
Horsfall et al.

(10) Patent No.: US 12,359,668 B2
(45) Date of Patent: Jul. 15, 2025

(54) MOLD PUMP ENGAGEMENT APPARATUS

(71) Applicant: PYROTEK, INC., Spokane, WA (US)

(72) Inventors: Andrew Horsfall, Cuyahoga Falls, OH (US); Jon Tipton, Aurora, OH (US)

(73) Assignee: PYROTEK, INC., Spokane, WA (US)

( * ) Notice: Subject to any disclaimer, the term of this patent is extended or adjusted under 35 U.S.C. 154(b) by 0 days.

(21) Appl. No.: 18/379,903

(22) Filed: Oct. 13, 2023

(65) Prior Publication Data

US 2024/0035475 A1 Feb. 1, 2024

Related U.S. Application Data

(62) Division of application No. 16/632,019, filed as application No. PCT/US2018/043036 on Jul. 20, 2018, now Pat. No. 11,795,950.

(60) Provisional application No. 62/534,959, filed on Jul. 20, 2017.

(51) Int. Cl.

| | |
|---|---|
| ***F04D 7/06*** | (2006.01) |
| ***B22D 39/02*** | (2006.01) |
| ***F04D 29/60*** | (2006.01) |
| ***F27D 27/00*** | (2010.01) |

(52) U.S. Cl.

CPC ............. *F04D 7/065* (2013.01); *B22D 39/02* (2013.01); *F04D 29/605* (2013.01); *F27D 27/005* (2013.01)

(58) Field of Classification Search

CPC ........ B22D 18/04; B22D 18/08; B22D 39/00; B22D 39/02; B22D 39/023; F04D 29/60; F04D 29/605; F04D 29/62; F04D 29/622; F27D 3/14; F27D 27/005; F27B 14/08; F27B 2014/0818

See application file for complete search history.

(56) References Cited

U.S. PATENT DOCUMENTS

| | | | | |
|---|---|---|---|---|
| 2,775,009 A * | 12/1956 | Meldrum | B41B 7/04 222/596 |
| 3,972,369 A * | 8/1976 | Carbonnel | B22D 18/04 164/147.1 |
| 4,161,647 A * | 7/1979 | Carbonnel | B22D 18/00 219/535 |
| 5,407,000 A * | 4/1995 | Mercer, II | B22D 17/30 164/133 |
| 2002/0125620 A1* | 9/2002 | Kinosz | F27B 19/02 266/200 |
| 2013/0068412 A1* | 3/2013 | Tipton | F04D 7/00 164/133 |

FOREIGN PATENT DOCUMENTS

| | | | |
|---|---|---|---|
| EP | 577909 A1 * | 1/1994 | B22D 41/56 |

* cited by examiner

*Primary Examiner* — Kevin E Yoon
*Assistant Examiner* — Jacky Yuen
(74) *Attorney, Agent, or Firm* — Lippes Mathias LLP

(57) ABSTRACT

A molten metal pump assembly and method to fill a mold with molten metal, such as aluminum. The assembly includes a support frame for suspending the molten metal pump above a furnace. The support frame includes a mechanism for lifting and lowering the molten metal pump into engagement and disengagement with the mold.

12 Claims, 7 Drawing Sheets

MOLD PUMP ENGAGEMENT APPARATUS

This application claims the benefit of U.S. Provisional Application No. 62/434,959, filed Jul. 20, 2017, the disclosure of which is herein incorporated by reference.

BACKGROUND

The present exemplary embodiment relates to a pump assembly to pump molten metal. It finds particular application in conjunction with a shaft and impeller style pump used for filling molds with molten metal, and will be described with particular reference thereto. However, it is to be appreciated that the present exemplary embodiment is also amenable to other like applications.

At times it is necessary to move metals in their liquid or molten form. Molten metal pumps are sometimes utilized to transfer or circulate molten metal through a system of pipes or within a storage vessel. These pumps generally include a motor supported by a base member having a rotatable elongated shaft extending into a body of molten metal to rotate an impeller. The base member is submerged in the molten metal and includes a housing or pump chamber having the impeller located therein. The motor is supported by a platform that is rigidly attached to a plurality of structural posts or a central support tube that is attached to the base member. The plurality of structural posts and the rotatable elongated shaft extends from the motor into the pump chamber submerged in the molten metal within which the impeller is rotated. Rotation of the impeller therein causes a directed flow of molten metal.

The impeller is mounted within the chamber in the base member and is supported by bearing rings to act as a wear resistant surface and allow smooth rotation. Additionally, a radial bearing surface can be provided on the elongated shaft or impeller to prevent excessive vibration of the pump assembly which could lead to inefficiency or even failure of pump components. These pumps have traditionally been referred to as centrifugal pumps. Shaft and impeller pumps have become increasingly more widely accepted for use in filing of molds with molten metal, such as aluminum, zinc and alloys thereof.

In many die casting operations it is necessary for the molten metal feed mechanism (these can include pressurized furnaces, mechanical pumps and electromagnetic pumps) to move from a position engaged with the mold to a position of disengagement. Disengagement allows a new mold cavity to be associated with the source of molten metal while engagement allows the mold cavity to be filled with molten metal. In some cases the source of molten metal is moved to a stationary mold and in some cases the mold is moved to a stationary source of molten metal. In the case of the relatively stationary mold, engagement/disengagement to the mold can be accomplished by lifting of the molten metal delivery device into contact with the mold. Since a typical furnace can contain several thousand pounds of molten metal, the precision of this movement can prove challenging. Furthermore, the components that form the interface between mold and the molten metal delivery source are often formed of relatively fragile refractory and/or ceramic materials. Having a system for engagement with the mold which moderates force at the point of engagement would be advantageous.

The present disclosure provides an assembly that facilitates precise mating between a molten metal pump and an associated mold.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In one embodiment, the present disclosure relates to a molten metal pump assembly to fill a mold with molten metal. The pump comprises an elongated shaft connecting a motor to an impeller. The impeller is housed within a pump chamber of a base such that rotation of the impeller draws molten metal into the chamber at an inlet and forces molten metal through an outlet of the chamber and into a riser assembly. A frame configured to receive the pump is also provided. The frame is mounted to an associated furnace apparatus. The frame suspends the pump such that the base is disposed in molten metal residing in the furnace apparatus. The frame also includes a mechanism for selectively raising and lowering the pump to moderate forces encountered during engagement with the mold.

According to another embodiment, a method of filling a mold with molten metal is provided. The method includes the steps of providing a furnace configured for containing molten metal. The furnace is capable of being raised and lowered. The method also provides a molten metal pump having a first side configured for immersion in the molten metal and a second side configured for engaging the mold. A frame member is also provided and includes a portion connected with the furnace and a portion connected with the molten metal pump. The frame member includes a force moderating mechanism suitable for raising and lowering the molten metal pump. Further steps include positioning an inlet to the mold above an outlet from the pump, raising the furnace to bring the pump outlet into engagement with the mold inlet while the force moderating mechanism functions to moderate forces during engagement of the pump outlet with the mold inlet, and activating the pump to fill the associated mold with molten metal.

In certain instances, the method includes the steps of deactivating the molten metal pump, lowering the furnace, removing the mold, providing a fresh mold, positioning the inlet of the fresh mold above the outlet from the pump, raising the furnace to bring the pump outlet into engagement with the fresh mold inlet, operating the force moderating mechanism to complete engagement of the pump outlet with the fresh mold inlet, and activating the molten metal pump to fill the associated mold with the molten metal In a further embodiment, a molten metal molding assembly is provided. The assembly includes a furnace, a mold having an inlet, and a pump configured to receive molten metal from the furnace and deliver the molten metal to a riser assembly which is in selective fluid communication with the inlet. A frame is configured to support the pump and includes a lever mechanism for selectively raising and lowering the pump into engagement and disengagement with the mold.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
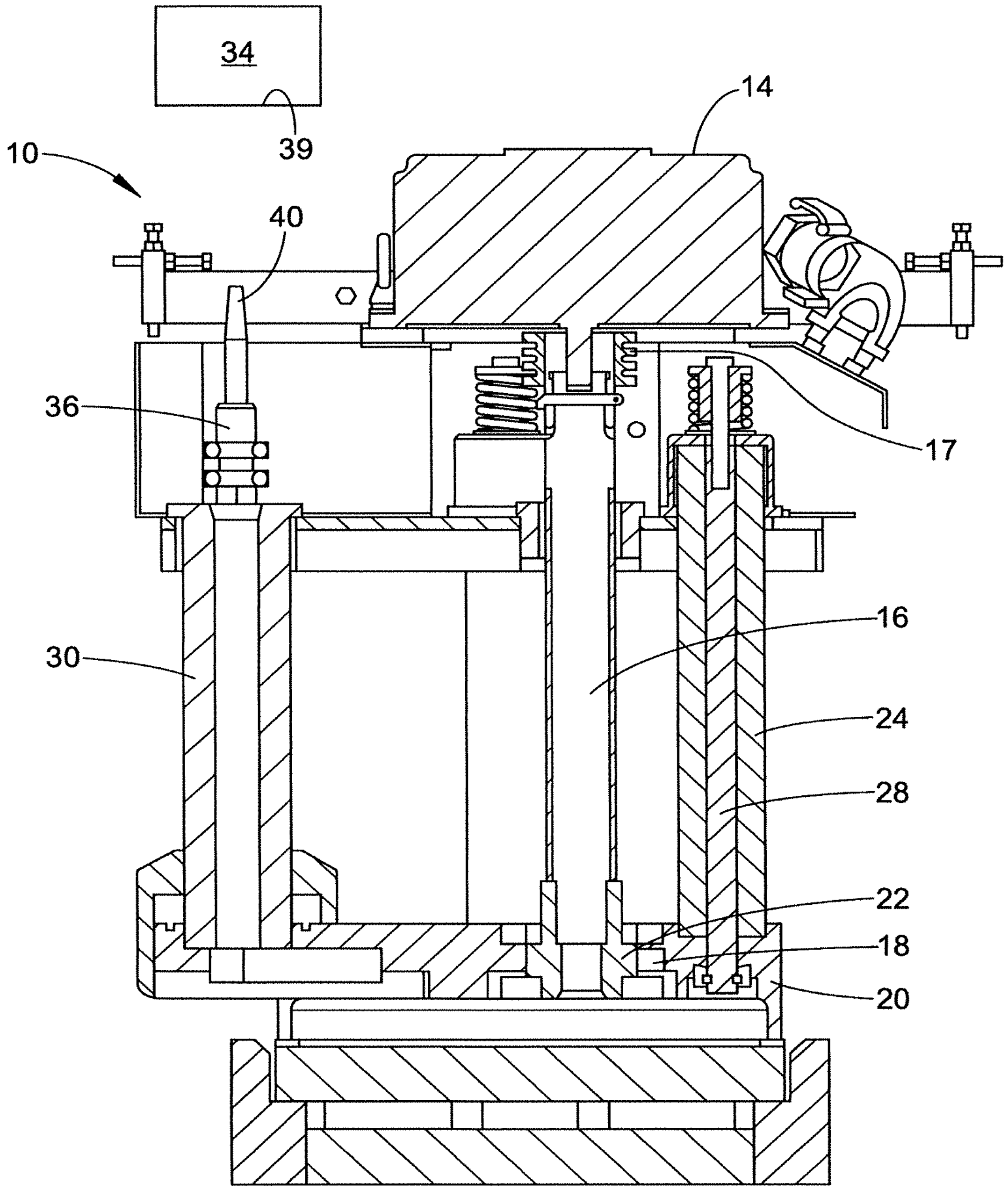
FIG. 1 is a front view of a molten metal pump.

To aid the Patent Office and any readers of any patent issued on this application in interpreting the claims appended hereto, Applicant wants to note that there is no intention to invoke 35 U.S.C. § 112(f) unless the words "means for" are explicitly used in a particular claim.

It is to be understood that the detailed figures are for purposes of illustrating the exemplary embodiments only and are not intended to be limiting. Additionally, it will be appreciated that the drawings are not necessarily to scale and that portions of certain elements may be exaggerated for the purpose of clarity and ease of illustration.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms "about", "generally" and "substantially" are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

The present disclosure describes a mechanical device that is used for the suspension of a mold filling centrifugal pump used with molten aluminum, zinc and alloys thereof. The device includes a combined or separate spring system and a four bar linkage system that allows for even engagement of the pump with a mold. This engagement will allow even pressure to be applied to the mold without damaging fragile ceramic components and maintains pump alignment. While the present disclosure is largely focused on a mechanical molten metal pump, it is also believed that the suspension device could work equally well with an electromagnetic pump.

With reference to FIG. 1, an example of a molten metal pump assembly 10 suitable for submergence in a bath of molten metal is depicted. The molten metal pump assembly 10 includes a motor 14 connected to an elongated shaft 16 via coupling 17. The motor is adapted to be run at variable speed by a programmable controller, such as a computer or other processor. The elongated shaft 16 is connected to an impeller 22 located in the chamber 18 of a base member 20. The base member 20 is suspended by a plurality of refractory posts 24 surrounding a steel rod 28. An exemplary pump suitable for use in the present assembly is described in US2014/0044520, the disclosure of which is herein incorporated by reference.

The elongated shaft 16 is rotated by the motor 14 and extends from the motor 14 and into the pump chamber 18 submerged in the molten metal within which the impeller 22 is rotated. Rotation of the impeller 22 causes a directed flow of molten metal through riser 30. The pump riser in turn is connected to a heated riser which is configured for mating with a mold, schematically illustrated by box 34, which includes an inlet 39 for receiving nozzle 40 or riser 36.

FIGS. 2-7 illustrate the support frame 200 of the present disclosure which suspends the molten metal pump 10 above a casting furnace 300. The support frame includes legs 202 configured for attachment to an upper region of the furnace and is sized relative to pump dimensions to allow the molten metal pump to have its pumping chamber submerged within the molten metal housed within the furnace. The support frame 200 further includes beams 204, each extending between a pair of legs 202. A pair of stationary cross members 205 interconnect beams 204.

Pump scaffolding 208 includes a pump frame 210 to which pump 10 is directly secured. Pump frame 210 is joined at its corners to lift frame 212. The support frame 200 further includes a lift mechanism 206 interposed between the beams 204 and the pump scaffolding 208 to allow lifting of the pump into engagement with the mold and lowering of the pump as described below. Lift mechanism 206 is interposed between beams 204 and lift frame 212. Lift mechanism 206 includes levers 214. Identical levers 214 are provided on each side of the support frame 200.

Pulling down on handle 216 causes cams 218 to rotate about their point of connection 220 with beams 204 causing cam 218 to rise at its point of connection 222 with lift frame 212. Bar 224 extends between one corner of cam 218 and a second cam 226. When cams 218 are rotated, bars 224 cause rotation of cams 226 around their point of connection 228 with beam 204 which raises lift frame 212 at its point of connection 230. A cross bar 232 extends between cams 226.

Generally the range of motion of the lift mechanism 206 will be between about 0.5 and 2 inches. The lift frame 212 orients the pump 10 in a raised position allowing the pump riser (36/36') to engage the mold when the furnace is raised. Typically, the furnace is raised and lowered via hydraulic, pneumatic, or screw jack apparatus. The raised levers 214 provide a force moderating component in response to an excessive hydraulic, pneumatic, or mechanical force supplied by a furnace lifting apparatus. Moreover, if the pump 10 engages the mold 34 with excessive force, the levers 214 are tripped and the support frame 200 lowers the pump 10 away from the mold 10 being engaged.

The lift frame 212 provides a force moderating mechanism. The force moderating mechanism allows the molten metal pump to be raised at the time a fresh mold assembly is being engaged for molten metal introduction.

The force moderating mechanism can include a counterweight 250 engaged at 240 that can bias the pump 10 in a raised position. If a force in excess of the counterweight is encountered during the mating process, the molten metal pump 10 is urged to descend. Preferably, the counterweight force is suitable to form a seal between the heated riser 36/36' and the mold inlet 39, but forgiving enough to activate lowering of the pump before damage to any fragile components would occur.

Figure 3:
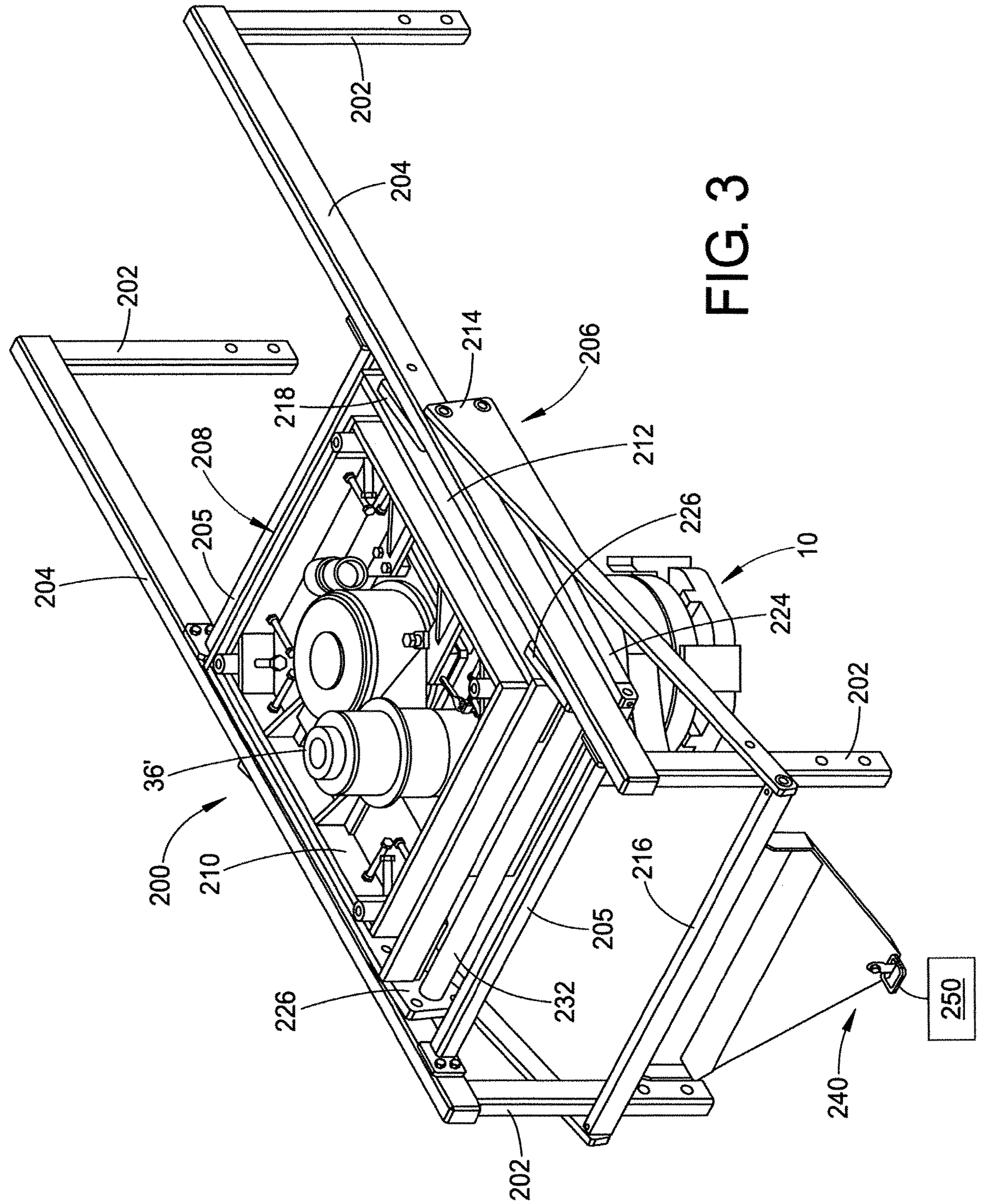
FIG. 3 is a perspective view of the pump in association with the frame assembly with the pump in a raised position.

Counterweight 250 can be hooked to the activation point 240, particularly when the pump 10 is in its raised position (see FIG. 3). In this manner, the counterweight can provide a specific tripping force at which the pump is lowered to avoid damage from an overly aggressive engagement with the mold. The pump can engage the mold with a mating pressure of less than 100 lbs, or less than 75 lbs, or less than 50 lbs. or about 40 lbs. In most instances, the counterweight will be sufficiently heavy to keep the pump in the raised position throughout the mold filling step. In most applications, the mechanical advantage of the lift mechanism will provide between 0.5 and 10 times magnification of the counterweight. Thus, the counterweight can weigh between 10 and 200% of the weight of the pump. A similar calculation can be applied to additional counterweighting that could be added to provide mating pressure.

Figure 5:
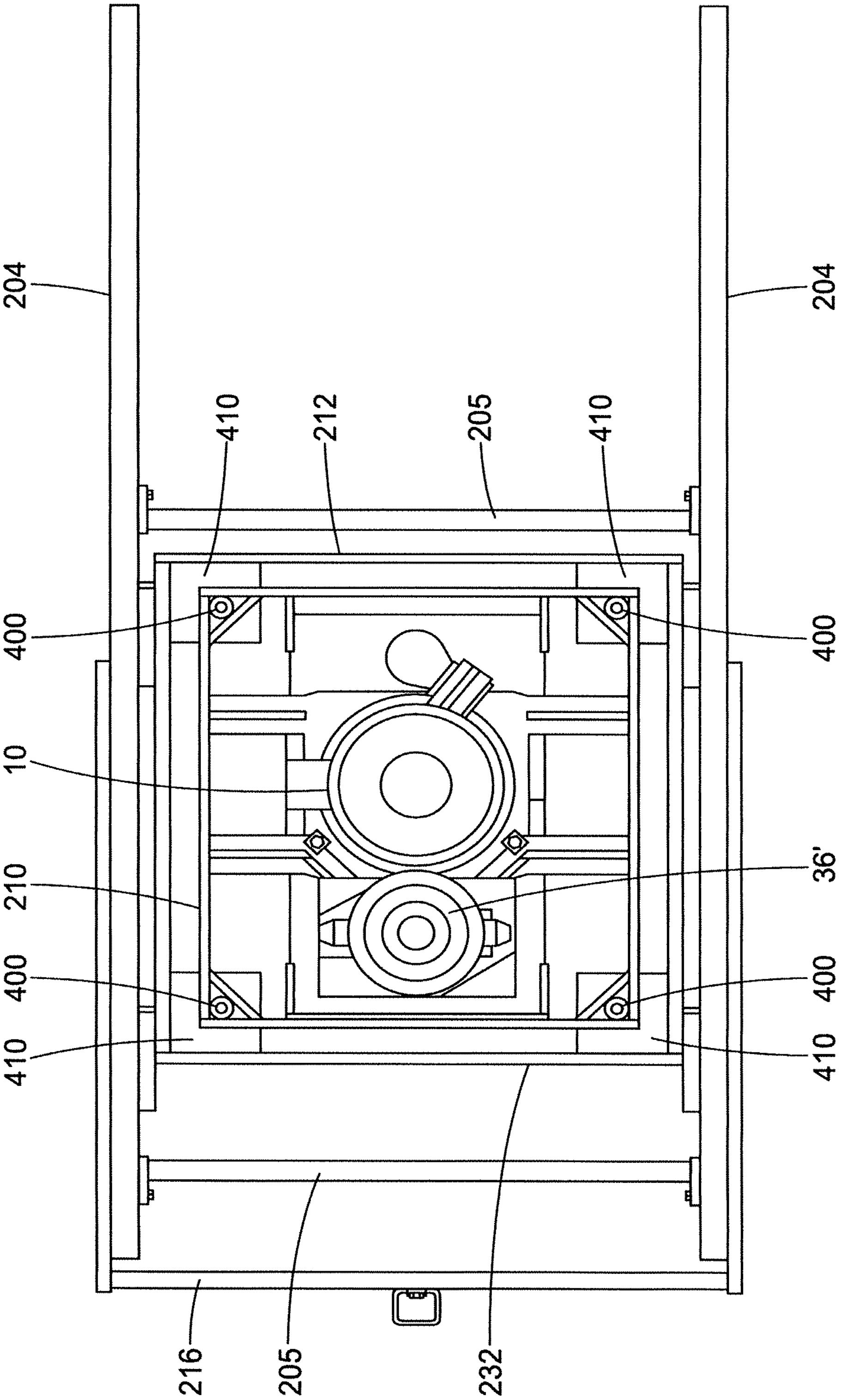
FIG. 5 is a top view of the pump and frame assembly of FIG. 2.
Figure 6:
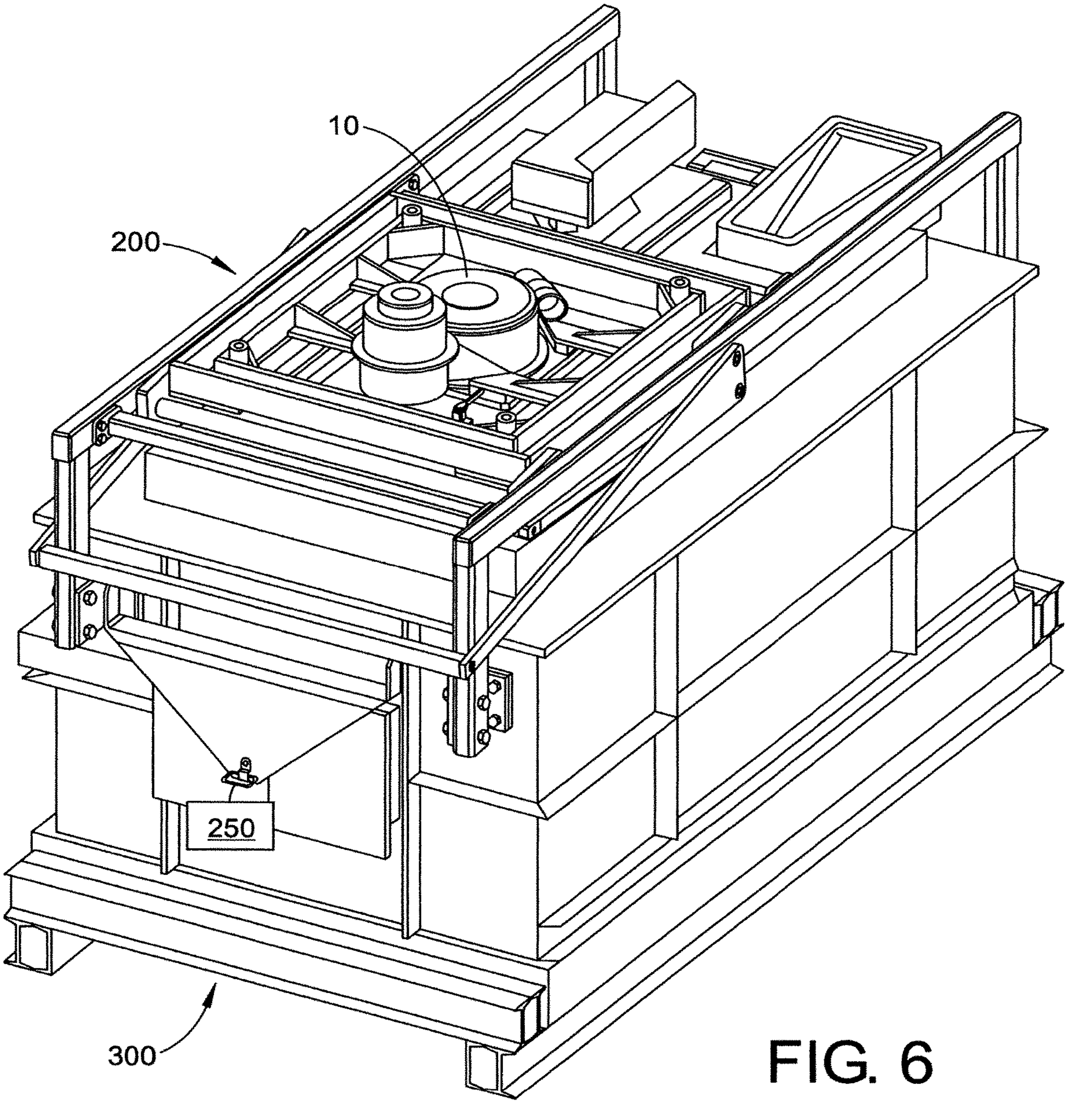
FIG. 6 is an illustration of the support frame and pump in association with a furnace.
Figure 7:
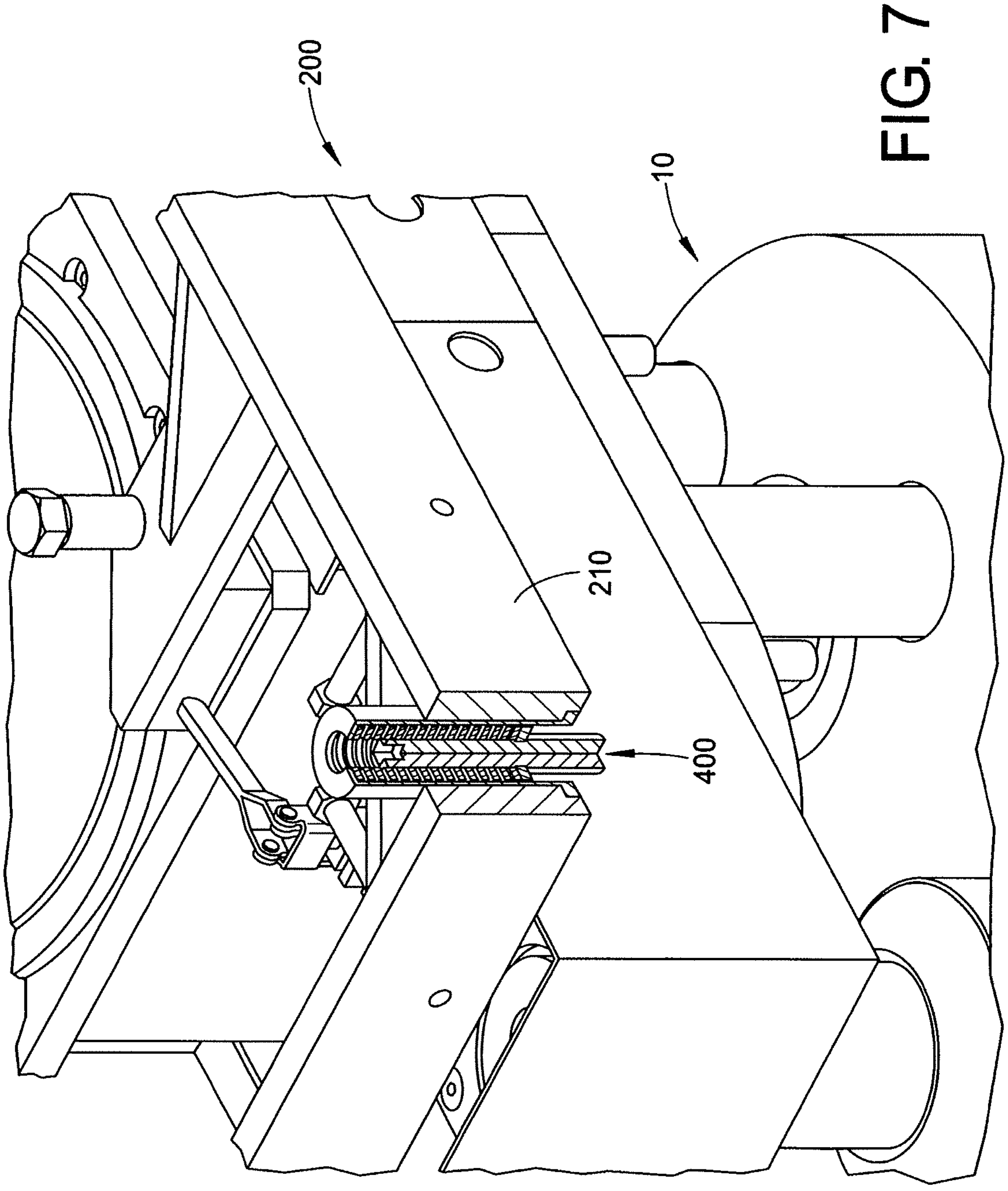
FIG. 7 is a detailed view of a spring interconnection between the lifting mechanism of the support frame and the molten metal pump scaffolding component.

With reference to FIGS. 5-7 and the support frame 200 can also include at least one resilient element 400 disposed between pump frame 210 and a furnace engaging section such as lift frame 212. More particularly, each corner of pump frame 210 can include a resilient element 400 extending below a lower edge of pump frame 210. Resilient elements 400 are received by shelves 410 at the interior corners of lift frame 212 (see FIG. 5). The spring elements are included to provide a resilient mating between the heated riser 36' and the mold. Resilient mating can protect and prolong the life of the refractory/ceramic components utilized in the assembly. The resilient elements similarly allow a relatively constant force to be applied over a range of mated positions. The resilient element can be a spring or an elastomeric insert.

In this manner the furnace, including the molten metal pump mounted to the support frame, can be raised and lowered using the furnace lifting apparatus such that the heated riser is brought into engagement with the mold inlet. The force moderating mechanism of the support frame can then be used to moderate the molten metal pump engagement with the mold. Advantageously, the force moderating mechanism allows a more accurate and constant force of engagement between the heated riser and the mold. Moreover, since the pump riser and heated riser are typically constructed of refractory and/or ceramic material, completing engagement with the mold with greater precision than relying on the furnace lifting apparatus alone is advantageous.

Figure 2:
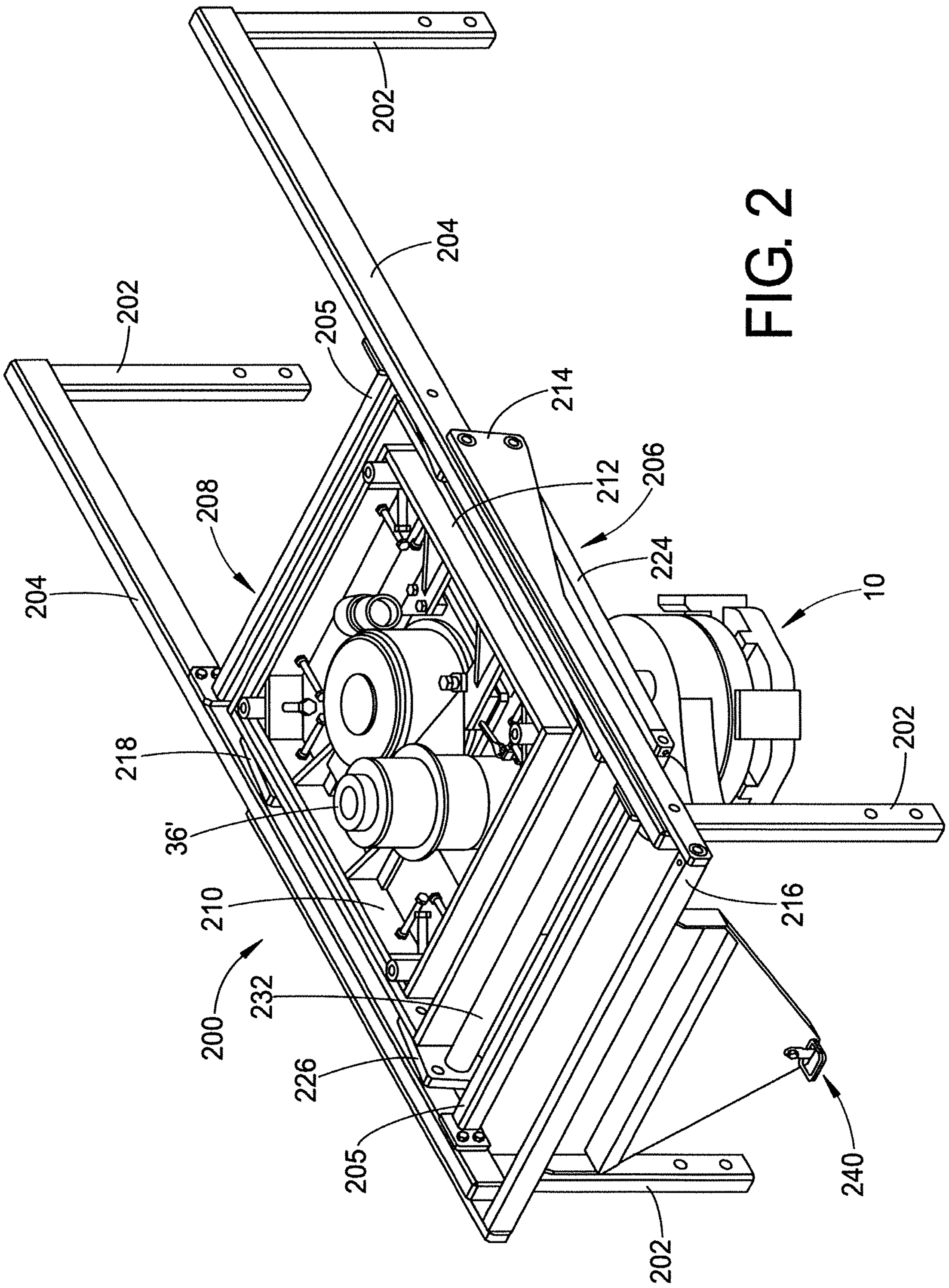
FIG. 2 is a perspective view of the pump in association with the frame assembly of the present disclosure with the pump in a lowered position.
Figure 4:
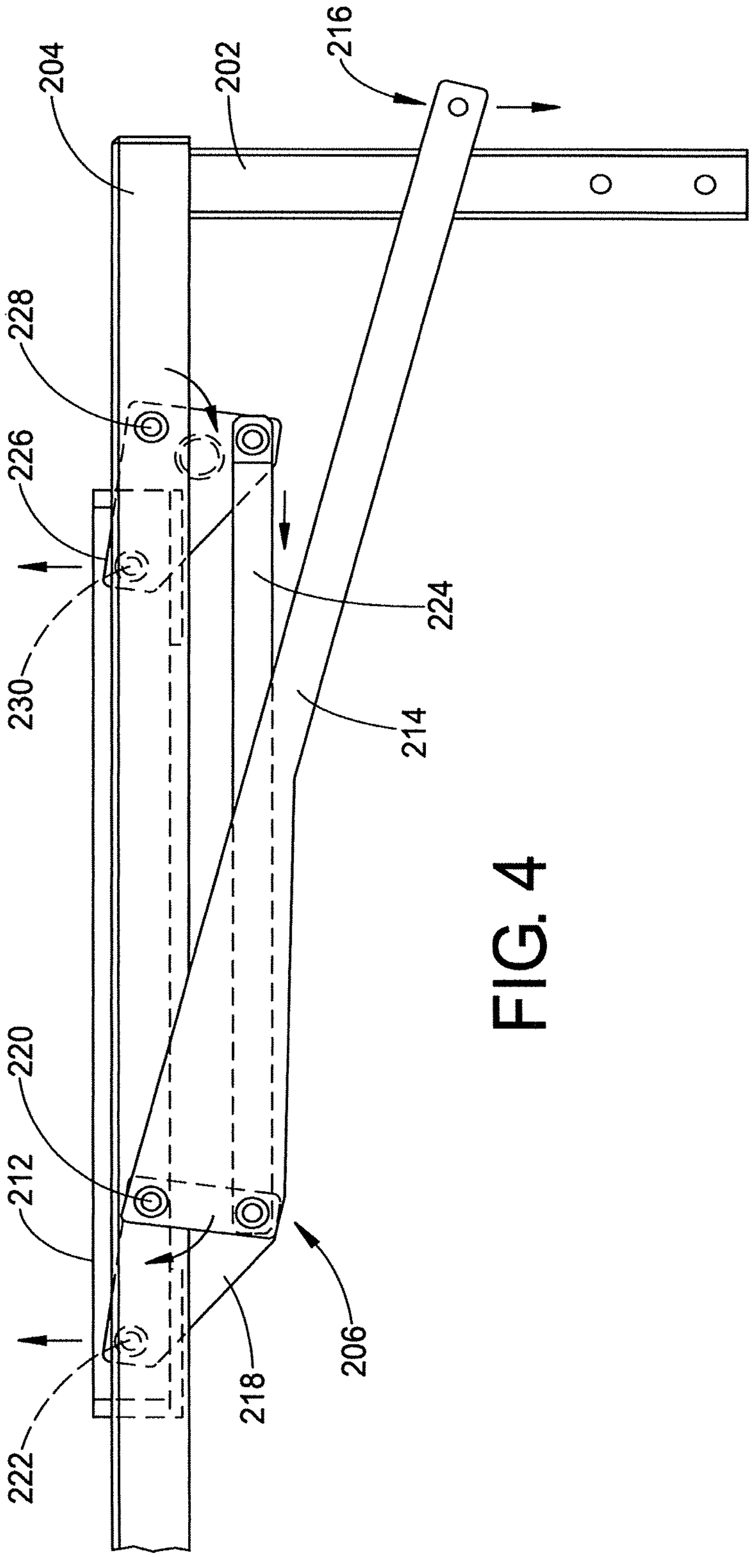
FIG. 4 is an illustration of the linkage elements of the lifting mechanism.

The support frame in FIG. 2 illustrates the force moderating mechanism in a lowered position. FIG. 3 illustrates the force moderating mechanism in a raised position. FIG. 4 illustrates the function of the linkage of the force moderating mechanism. Moreover, the interaction of the various elements when the handle of the force moderating mechanism is pulled lower by attachment of the counterweight resulting in raising of the molten metal pump support scaffold (see upward pointing arrows). FIG. 6 illustrates the support frame as attached to the casting furnace. As shown, the molten metal pump is suspended above the furnace in a manner such that the pumping chamber can pass through an opening in the furnace roof and be submerged in molten metal. The scaffolding portion is raised (and lowered) by the force moderating mechanism to assist with engaging/disengaging of an associated mold (see the heated riser depicted in FIG. 7 which is of course raised and lowered with the pump assembly).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of filling a mold with molten metal, the method comprising:

providing a furnace configured for containing molten metal, said furnace being capable of being raised and lowered, providing a molten metal pump having a first end configured for immersion in said molten metal and a second end configured for engaging said mold;

providing a frame member having a portion connected with said furnace and a portion connected with said molten metal pump, said frame member including a mechanism suitable for lifting and lowering said molten metal pump; and positioning an inlet to said mold above an outlet from said pump, raising said furnace to bring said pump outlet into association with said mold inlet, operating said mechanism to complete engagement of said pump outlet with said mold inlet, and activating said molten metal pump to fill the associated mold with molten metal.

2. The method of claim 1 including the steps of deactivating said molten metal pump lowering said mechanism, lowering said furnace, removing said mold, and positioning an inlet to a fresh mold above the outlet from said pump, raising said furnace to bring said pump outlet into association with said fresh mold inlet, operating said mechanism to complete engagement of said pump outlet with said fresh mold inlet, and activating said molten metal pump to fill the associated fresh mold with molten metal.

3. The method of claim 1 wherein said mechanism comprises a lever arm.

4. The method of claim 3 wherein said lever arm orients said pump in a raised position wherein the pump engages the mold and lowers the pump in response to an excessive hydraulic, pneumatic, or mechanical force supplied by a furnace lifting apparatus.

5. The method of claim 1 wherein said frame member includes at least one resilient element disposed between a pump engaging section and a furnace apparatus engaging frame.

6. The method of claim 5 wherein said at least one resilient element is further disposed between a riser component of the pump and the furnace engaging frame.

7. The method of claim 5 wherein said resilient element comprises a spring.

8. The method of claim 1 wherein said lifting and lowering covers a distance of between about 0.5 and 2 inches.

9. The method of claim 1 wherein said pump engages said mold inlet with a mating pressure of less than 100 lbs.

10. The method of claim 1 wherein a counterweight is used to lift the pump to a raised position.

11. The method of claim 10 wherein said counterweight weighs between about 10 and 200 weight percent of the pump.

12. The method of claim 1 wherein said pump includes a heated riser configured for mating with the mold.

* * * * *